United States Patent [19]
Morris et al.

[11] Patent Number: 4,964,883
[45] Date of Patent: Oct. 23, 1990

[54] CERAMIC ALUMINA ABRASIVE GRAINS SEEDED WITH IRON OXIDE

[75] Inventors: Mary Lou Morris; Thomas E. Wood, both of St. Paul, Minn.

[73] Assignee: Minnesota Mining and Manufacturing Company, St. Paul, Minn.

[21] Appl. No.: 282,593

[22] Filed: Dec. 12, 1988

[51] Int. Cl.$^5$ .............................................. B24D 3/00
[52] U.S. Cl. ......................................... 51/293; 51/309
[58] Field of Search .................................. 51/293, 309

[56] References Cited

U.S. PATENT DOCUMENTS

| | | | |
|---|---|---|---|
| 3,615,306 | 10/1971 | Jones, II | 51/309 |
| 4,314,827 | 2/1982 | Leitheiser et al. | 51/309 |
| 4,518,397 | 5/1985 | Leitheiser et al. | 51/293 |
| 4,543,107 | 9/1985 | Rue | 51/309 |
| 4,574,003 | 3/1986 | Gerk | 51/309 |
| 4,623,364 | 11/1986 | Cottringer et al. | 51/309 |
| 4,657,754 | 4/1987 | Bauer et al. | 423/625 |
| 4,744,802 | 5/1988 | Schwabel | 51/309 |
| 4,797,139 | 1/1989 | Bauer | 51/293 |

FOREIGN PATENT DOCUMENTS 0209084 1/1987 European Pat. Off. .

OTHER PUBLICATIONS

M. Kumagai and G. L. Messing "Enhanced Densification of Boehmite Sol–Gels by Alpha Alumina Seeding" *Communications of the American Ceramic Society*, Nov., 1984.
J. L. McArdle and G. L. Messing "Transformation and Microstructure Control in Boehmite-Derived Alumina by Ferric Oxide Seeding" *Advanced Ceramic Materials*, vol. 3, No. 4, 1988.
E. Matigevic and P. Scheiner, *Journal of Colloidal Interface Science*, vol. 63, No. 3, 1978, pp. 509–524.
B. Voight and A. Gobler, *Crystal Research Technology*, vol. 21, 1987, pp. 1177–1183.
R. N. Sylva "The Hydrolysis of Iron (III)", *Rev. Pure Applied Chemstry*, vol. 22, 1972, p. 15.
T. Misawa, K. Hashimoto and S. Shimodaira, "The Mechanism of Formation of Iron Oxide and Oxyhydroxides in Aqueous Solutions at Room Temperature" *Corrosion Science*, vol. 14, 1974, p. 131.
U.S. Statutory Invention Registration No. H189, published Jan. 6, 1987, in the name of Bauer.

*Primary Examiner*—William R. Dixon, Jr.
*Assistant Examiner*—Willie Thompson
*Attorney, Agent, or Firm*—Donald M. Sell; Walter N. Kirn; Richard Francis

[57] ABSTRACT

A process of producing alpha alumina ceramic abrasive grain by sintering alpha alumina monohydrate is improved by seeding with a crystalline oxide of iron having a particle size of less than 150 nm.

17 Claims, No Drawings

CERAMIC ALUMINA ABRASIVE GRAINS SEEDED WITH IRON OXIDE

Technical Field

The present invention relates to the production of ceramic abrasive grains by sintering alumina hydrate in the presence of crystalline iron oxide seed material to initiate transformation to alpha alumina and abrasive products made with the abrasive grains.

Background Art

The preparation by a chemical ceramic sol-gel process of dense, alumina-based ceramic abrasive grain by gelling alumina monohydrate with a precursor of at least one modifying component followed by dehydration and firing is disclosed in assignee's U.S. Pat. No. 4,314,827 (Leitheiser et al). It was subsequently discovered that such ceramic abrasive grains may be improved by including a seeding material with the alumina hydrate to provide a finer crystalline structure in the fired alpha alumina. The seeding of alpha alumina ceramic obtained by firing alumina hydrate with alpha alumina seed material is known. M. Kumagai and G. L. Messing spoke at the American Ceramic Society meeting on May 2, 1984 on this subject and later caused the publishing of a paper in November, 1984 in *Communications of The American Ceramic Society* entitled "Enhanced Densification of Boehmite Sol-Gels by Alpha Alumina Seeding". U.S. Pat. No. 4,623,364 (Cottringer et al) discloses a method for producing polycrystalline alumina based abrasive grain by mixing submicron alpha alumina seed material with fine alumina hydrate particles, and firing to a temperature of at least 1090° C. European Patent Application No. 209,084, published Jan. 21, 1987, discloses a method for producing a sol-gel type ceramic abrasive grain wherein a precursor stage material consisting of aluminum hydroxide is mixed, dried, calcined and sintered with an advanced precursor stage material, followed by dehydrating, calcining and sintering. Assignee's U.S. application Ser. No. 15,583 (Gerk) filed Feb. 17, 1987 discloses a method for producing a sol-gel type ceramic abrasive grain by adding fine particles of alpha alumina to the alpha alumina monohydrate prior to gelling and firing.

Assignee's U.S. Pat. No. 4,744,802 (Schwabel) discloses nucleating alpha alumina monohydrate with particles of alpha alumina, iron oxide or their respective precursors to produce alpha alumina ceramic abrasive grits. While the Schwabel disclosure indicates that the particle size of the nucleating agent can vary considerably, it discloses that, in the case of alpha alumina, a particle size from about 80 to about 100 nm was found useful but smaller and larger particles were also thought to be useful. The Schwabel patent discloses nucleating with ferric nitrate (iron oxide precursor) solution which transformed to particulate crystalline iron oxide particles in situ of an unknown particle size during processing prior to sintering and particulate alpha ferric oxide having a particle size of 0.2×0.02 micrometer (200×20 nm). Schwabel makes no mention that an unexpected performance improvement could result from seeding with particulate crystalline iron oxide having a particle size of less than 150 nm.

James L. McArdle and Gary L. Messing, in an article entitled "Transformation and Microstructure Control in Boehmite-Derived Alumina by Ferric Oxide Seeding" in *Advanced Ceramic Materials*, Volume 3, No. 4, 1988, disclose nucleating alumina gels with particulate ferric oxide to enhance the transformation from gamma alumina to alpha alumina. The nucleating agents include either alpha alumina particles or alpha ferric oxide particles having a particle size distribution of 15 to 90 nm with 80% of the particles being between 30 and 70 nm. The article does not, however, suggest that abrasive grain with unexpected improvement in performance may be obtained from utilizing crystalline iron oxide nucleating particles of an average particle size less than 150 nm.

Summary of the Invention

The invention provides a process for making improved abrasive grain. More specifically, the process comprises the steps of (a) preparing a dispersion of alpha alumina monohydrate particles;

(b) seeding the dispersion with crystalline iron oxide particles;

(c) gelling the dispersion;

(d) drying the seeded gelled dispersion to form a solid;

(e) calcining the solid;

(f) crushing the dried or calcined solid to form particles; and (g) sintering the calcined particles, the improvement comprising said crystalline iron oxide particles having an average particle size of less than 150 nm and said seeding being achieved by adding said crystalline iron oxide particles to said dispersion.

The addition of the crystalline iron oxide seed material lowers the transformation temperature of the conversion of the transitional forms of alumina present in the dispersion to the alpha alumina. If the crystalline iron oxide seed material has an average particle size less than about 150 nm, abrasive grain having an unexpected improvement in abrasive performance is provided.

The term "iron oxide" as hereinafter used is intended to refer to all crystalline oxidized forms of iron which promote the transformation of the various phases of alumina to alpha alumina. The terms "seeding" and "nucleating" as herein used are intended to be equivalent and they will be used interchangably.

Iron oxides which are useful as seeding materials according to the present invention are selected from the group consisting of goethite, lepidocrocite, hematite (alpha ferric oxide), magnetite, maghemite, and mixtures thereof. The most preferred iron oxides are goethite, lepidocrocite and hematite.

The term "crystalline iron oxide particle" is intended to include particulate iron oxide precursors which, when heated, convert to a crystalline iron oxide particle which is suitable as a seeding material. For example, during sintering, the precursor of hematite converts to hematite of an appropriate particle size for seeding at a temperature below the temperature at which alpha alumina hydrate converts to alpha alumina. The term "crystalline iron oxide particle" is not intended to include particulate forms of iron oxide, e.g., certain amorphous forms of iron oxide, which do not, when heated, convert to a crystalline iron oxide particle. Such particulate forms of iron oxide are generally seeded by the alumina instead of seeding the alumina and they will not produce seeded alpha alumina.

The invention also provides novel abrasive products which contain abrasive grain wherein at least a portion of the abrasive grain is the abrasive grain of the present invention. Preferred abrasive products are coated abrasives, bonded abrasives, such as abrasive grinding wheels, and lofty nonwoven abrasives.

DETAILED DESCRIPTION OF THE INVENTION

The preparation of alumina-based ceramic materials from a sol-gel process usually begins with the preparation of a dispersion comprising from about 2 to almost 60 weight percent alpha aluminum oxide monohydrate (boehmite), although other hydrates can be used. The boehmite can either be prepared from various techniques well known in the art or can be acquired commercially from a number of suppliers. Examples of commercially available materials include Disperal®, produced by Condea Chemie, GmbH and Catapal D, produced by Vista Chemical Company. These aluminum oxide monohydrates are in the alpha form, are relatively pure (including relatively little, if any, hydrate phases other than monohydrates), and have a high surface area. The physical properties of the final fired product will generally depend upon the type alumina monohydrate chosen for the dispersion.

The dispersion may contain a precursor of a modifying additive which can be added to enhance some desirable property of the finished product or increase the effectiveness of the sintering step. These precursors are generally added in the form of soluble salts, typically water soluble, and typically consist of a metal-containing compound and can be a precursor of the oxides of magnesium, zinc, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The exact proportions of these components that are present in the dispersion are not critical to this invention and thus can be varied to convenience.

A peptizing agent is usually added to the boehmite dispersion to produce a more stable hydrosol or colloidal dispersion. Monoprotic acids or acid compounds which may be used as the peptizing agent included acetic, hydrochloric, formic and nitric acid. Nitric acid is a preferred peptizing agent. Multiprotic acids are normally avoided since they rapidly gel the dispersion making it difficult to handle or mix in additional components. Some commercial sources of boehmite contain an acid titer (such as absorbed formic or nitric acid) to assist in forming a stable dispersion.

The dispersion can be formed by any suitable means which may simply be the mixing of aluminum oxide monohydrate with water containing a peptizing agent or by forming an aluminum oxide monohydrate slurry to which the peptizing acid is added. Once the dispersion is formed, it preferably is then gelled. The gel can be formed by any conventional technique such as the addition of a dissolved or dispersed metal containing modifying additive, e.g., magnesium nitrate, the removal of water from the dispersion or some combination of such techniques.

Once the gel has formed, it may be shaped by any convenient method such as pressing, molding or extrusion and then the shaped article may be dried to produce an uncracked body of the desired shape. The gel should be dried at a temperature below the frothing temperature of the gel. Any of several dewatering methods, including solvent extraction, can be used to remove the free water of the gel to form a solid.

After the solid is dried, it can be cut or machined to form a desired shape or crushed or broken by any suitable means, such as a hammer, roll crusher or ball mill, to form particles or grains. Any method of comminuting the solid can be used and the term "crushing" is used to include all such methods. The particles may be mechanically agitated, e.g., by tumbling immediately after drying or calcining to increase surface roughness to obtain better adhesion in a resin bond system.

After shaping, the dried gel can then be calcined to remove essentially all volatiles and transform the various components of the grains into ceramics (metal oxides). The dried gel is generally heated to a temperature between about 400 to about 800° C. and held within this temperature range until the free water and over 90 weight percent of any bound volatiles are removed.

The calcined materials are then sintered by heating to a temperature of between about 1000° C. and about 1650° C. and held within this temperature range until substantially all of the alpha alumina monohydrate is converted to alpha alumina.

The purpose of the nucleating agent is to enhance this transformation to alpha alumina. Of course, the length of time to which the ceramic must be exposed to the sintering temperature to achieve this level of conversion will depend upon various factors but usually from about 5 seconds to about 48 hours, preferably from about 5 to 90 minutes, is sufficient.

Other steps can be included in this process, such as rapidly heating the material from the calcining temperature to the sintering temperature, sizing granular materials, centrifuging the dispersion to remove sludge waste, etc. Moreover, this process can be modified by combining two or more of the individually described steps if desired. Seeding is preferably carried out prior to the gelling step but it may be accomplished after gelling if suitable high shear mixing is employed to obtain a uniform blend of the gelled dispersion and seed particles. Conventional process steps and materials are more fully described in assignee's U.S. Pat. No. 4,574,003.

The most significant aspect of this invention is the selection of very fine particles of crystalline iron oxide with an average particle size less than 150 nm to act as nucleating sites within the aluminum oxide monohydrate dispersion. The presence of such very fine particles of the iron oxide crystalline nucleating material in the dispersion results quite unexpectedly in a better performing abrasive grain as compared to an abrasive grain made by nucleating with conventional larger particle size nucleating material of the same or other composition.

As previously mentioned, useful iron oxides include goethite, lepidocrocite, hematite, magnetite, and maghemite, with hematite, lepidocrocite and goethite being preferred. Goethite, known also as alpha FeOOH or as alpha ferric oxyhydroxide, is yellow in color and has an orthorhombic crystal structure. Lepidocrocite, or gamma ferric oxyhdroxide (gamma-FeOOH) is similar to goethite, except it is orange in color. Hematite, alpha ferric oxide (alpha-$Fe_2O_3$), has a density of 5.24 g/$cm^3$ and melts or decomposes at 1565° C. Hematite is reddish brown in color and has a hexagonal crystal structure of closely packed oxygen anions with iron atoms in approximately two-thirds of the octahedral holes. Magnetite, or ferric oxide ($Fe_3O_4$), has a melting point of 1595° C., is black in color and the oxygen anions form a cubic, close-packed, crystal structure. Maghemite, also known as gamma ferric oxide or gamma-Fe$_2$O$_3$, is brown in color and forms a cubic crystal structure of close-packed oxygen anions with iron atoms distributed randomly between the octahedral and tetrahedral sites.

The iron oxides can be prepared by any technique will known in the art, so long as the average particle size is less than 150 nm. For example, a dispersion of hematite can be prepared by the thermal treating of iron nitrate solutions as is described by E. Matijevic and P. Scheiner (*J. Colloidal Interface Science*, Vol. 63, No. 3, 1978, pages 509–524) and by B. Voight and A. Gobler (*Crystal Research Technology*, Vol. 21, 1986, pp. 1177–1183). Lepidocrocite or gamma-FeOOH can be prepared by the oxidation of Fe(OH)$_2$ with a NaNO$_2$ solution. Maghemite, gamma-Fe$_2$O$_3$, can be obtained by dehydrating gamma-FeOOH under a vacuum. Gamma-FeOOH can also be converted to alpha Fe$_2$O$_3$ by heating or grinding gamma FeOOH in air. Goethite, alpha-FeOOH, can be conveniently synthesized by air oxidation of ferrous hydroxide or by aging a dispersion of ferric hydroxide at an elevated temperature and high pH. Additional information on the preparation of oxides of iron can be found in the articles "The Hydrolysis of Iron (III)" by R. N. Sylva (*Rev. Pure Applied Chemistry*, Vol. 22, 1972, p. 15) and "The Mechanism of Formation of Iron Oxide and Oxyhydroxides in Aqueous Solutions at Room Temperature" by T. Misawa, K. Hashimoto and S. Shimodaira (*Corrosion Science*, Vol. 14, 1974, p. 131).

The particle size of the iron oxide seeding material should be less than 150 nm, preferably 15 to 100 nm, most preferably 20 to 30 nm, to obtain improved abrasive performance. The amount of nucleating agent, by weight, preferably is in the range of about 0.01% to about 10% (preferably about 0.01% to 4%), based on the weight of the fired ceramic abrasive grain. High levels of iron oxide should be avoided since they could decrease performance in certain applications.

The type of iron oxide employed will vary, depending upon the crystallinity and the method of preparation. It may be spherical, acicular or planar. The average particle size refers to the size of the longest dimension of the particle which in the case of an elongate particle is its length. The particle size may be determined by measuring the longest particle dimension by any of a variety of conventional methods, e.g., by transmission electron microscopy (TEM) or by quasi elastic light scattering (QELS). A micrograph prepared by TEM may be employed to provide a magnified image of the particles which can be measured. An 80,000 magnification has been found to be useful for this purpose. QELS involves projecting a stream of light into a dispersion of the nucleating agent particles and determining the particle size by a numerical analysis of the fluctuations in the intensity of light scattered. Each of these techniques is well known in the art and equipment for making such measurements is commercially available.

The particles of iron oxide seeding material should be uniformly dispersed in the alumina hydrate dispersion to obtain maximum benefit from using fine particle size iron oxide. Since very small particles tend to agglomerate, steps preferably should be taken to prevent agglomeration. Agglomeration may be avoided by using a very dilute aqueous solution of the fine particle size iron oxide or by other means. Agglomeration may also be minimized by adding an iron oxide seeding material containing dispersion to a strongly agitated or rapidly stirred dispersion of the alpha alumina monohydrate.

The addition of the smaller crystalline particles of the iron oxide provides a larger population of alpha alumina crystalline growth sites per unit volume for a given weight percentage of the iron oxide than provided by larger particle size nucleating material of the same composition. Such sites act as initiation points for alpha alumina growth. The increased number of growth sites results in more rapid and complete densification of the alpha alumina during firing and may also produce a finer microstructure in the ceramic and an increase in performance of the abrasive grains made from the ceramic. It has been discovered, however, quite surprisingly that the best performing abrasive grain of the invention does not necessarily have the highest density and finest microstructure or have had the highest concentration of nucleating sites in the dispersion from which it was made. When the actual density is greater than 90% of theoretical, there appears to be little direct correlation between abrasive performance and the density of abrasive grain made according to the invention. For a given particle size of iron oxide seed, the grinding performance instead appears to correlate with the nature of the iron oxide seed material and its uniformity of dispersion within the precursor boehmite sol, with the more uniform dispersions of nucleating material providing the best abrasive.

While not being bound by theory, it is believed that the abrasive minerals of the invention perform better because of the uniform dispersion of seed particles of the iron oxide to initiate growth of the alpha phase results in a more homogeneous distribution of iron oxide in the final fired body. Since iron oxide is a much softer and weaker material than alpha alumina, the presence of larger iron-rich domains in the abrasive grain would weaken the physical integrity of the abrasive mineral and thereby diminish it's abrasive performance.

The iron oxide nucleating materials are sufficiently crystalline to have a discernible X-ray diffraction pattern. Hematite, which possess a hexagonal close-packed oxygen anion lattice is very efficient in seeding the alpha alumina transformation from boehmite-derived aluminas. It is thought that iron oxides which do not possess a hexagonal close-packed oxygen anion structure or an oxygen anion lattice which closely resembles a hexagonal close-packed structure should be capable of being transformed to one of these structures at a temperature below the alpha alumina transformation of boehmite in order to be effective as seeding agent for the alpha alumina transformation. The temperature at which the iron-containing particles transform will vary depending on the particle size, degree of crystallinity and the presence of impurities. The net result is that seeding efficiency, which is defined as the percentage of iron-containing particles which act as sites for the growth of the alpha alumina phase, is lower for iron oxides which do not possess a hexagonally close placed oxygen anion lattice.

The particles of iron oxide nucleating material generally cannot be found in the ceramic after firing although their use may easily be established by an elevated iron presence in the ceramic and an attendent fine microcrystalline structure in the ceramic of the abrasive grain. How the iron oxide nucleating material interacts with the other components during sintering is not known. The iron oxide after nucleating may react with alpha alumina to form an iron spinel (FeAl$_2$O$_4$), a solid solution with the alpha alumina or, if magnesia is present, an iron-substituted magnesium aluminum spinel structure.

While preferred alpha alumina-based ceramic was prior to the present invention thought to require minor amounts of magnesia as a toughening agent and sintering aid, it has been found quite unexpectedly that, as the particle size of the oxide of iron is decreased, the amount of magnesia likewise may be decreased without adverse effect on abrasive performance. This result is extremely beneficial since magnesium is typically added to the solution as a nitrate which during sintering creates airborne oxides of nitrogen which must be trapped or else they could pose environmental concerns. The magnesium oxide addition also results in spinel formation which is softer than the alpha alumina. Nonetheless, it should however be noted that the preferred abrasive grains of the present invention include minor amounts of magnesia.

The improved abrasive grain according to the invention may have a density varying from near its theoretical density, e.g., 95% or greater, to about 75%. Typically, the abrasive grain of the invention has a density greater than 3.75 g/cc and an average alpha alumina crystal domain size of less than about 1.5 micrometer. The ceramic material may be substantially void free or it may be characterized by including porosity, typically in the form of internal vermicular or equiaxial pores which are for the most part on the interior of the ceramic with a minor part of the pores extending to the surface. Porosity is very difficult to measure accurately by conventional porosity measuring techniques because the porosity is a mix of closed pores which do not extend to the surface and open pores which do. Closed porosity does not appear to have an adverse affect on the durability of the ceramic and, in fact, in some cases has been noted to provide improved abrasive performance in some applications.

The ceramic abrasive grains according to the invention may be used in conventional abrasive products, preferably as a blend with less expensive conventional abrasive grain, such as fused aluminum oxide, silicon carbide, garnet, fused alumina zirconia and the like.

The following examples are illustrative of certain specific embodiments of this invention. These examples are not to be construed as limiting the invention.

EXAMPLES

General Procedure for Making the Sol Gel Abrasive Grain

Abrasive grains were prepared by a sol gel process according to the following procedure.

Into an 18.9 liter polyethylene-lined steel vessel were charged 8700 grams of room temperature deionized water, 138 grams of an aqueous solution of 70% nitric acid, 2,760 grams of alpha aluminum oxide monohydrate powder sold under the trade designation Disperal ® and an iron oxide nucleating agent. The charge was dispersed at high speed for five minutes using a Gifford-Wood homogenizer mixer (Greeco Corp., Hudson, N.H.). The resulting dispersion and in some cases an aqueous solution containing the nitrate salt of magnesium were metered through an in-line mixer at a rate of 8 grams of the magnesium nitrate to 100 grams of the above dispersion. The resulting gel was extruded into a 46 cm×66 cm×5 cm polyester-lined aluminum tray where it was dried in a forced air oven at 100° C. to a friable solid.

The resultant dried material was crushed using a Braun type UD pulverizer having a 1.1 mm gap between the steel plates. The crushed material was screened and the 0.125 mm to about 1 mm screen size material was retained for firing.

The screened, crushed material was fed into the end of a calciner which was a 23 cm diameter 4.3 meter long stainless steel tube having a 2.9 meter hot zone, the tube being inclined at 2.4 degrees with respect to the horizontal, and rotating at 6 rpm, to provide residence time therein of about 15 minutes. The calciner had a hot zone feed end temperature of 350° C. and exit end temperature of 800° C. The fired product from the calciner was fed into a 1390° C. kiln which was 8.9 cm diameter 1.32 meter long silicon carbide tube inclined at 4.4 degrees with respect to the horizontal and having a 76 cm hot zone, rotating at 10.5 rpm, to provide a residence time therein of about 3.8 minutes. The product exited the kiln into room temperature air where it was collected in a metal container and allowed to cool to room temperature.

General Procedure for Testing and Making Coated Abrasive Products

The abrasive grains of the examples described herein were utilized in coated abrasive products which were tested for abrasiveness. The coated abrasive products were made according to conventional coated abrasive making procedures. The abrasive grains were screened to an ANSI grade 50, average particle size of 430 micrometers. The grade 50 abrasive grains were then bonded to vulcanized fiber backings using conventional calcium carbonate-filled phenolic make resin and conventional cryolite-filled phenolic size resin. The make resin was precured for 90 minutes at 88° C. and the size resin was precured for 90 minutes at 88° C. followed by a final cure of 10 hours at 100° C. The approximate dry coating weights (in grams/square meter) were 169 for the make, 530 for the abrasive grain and 350 for the size.

The cured discs were first conventionally flexed to controllably break the hard bonding resins, mounted on a beveled aluminum back-up pad, and used to grind the face of a 1.25 cm by 18 cm 1018 mild steel workpiece. The disc was driven at 5,500 rpm while the portion of the disc overlaying the beveled edge of the back-up pad contacted the workpiece at a 5.91 kg load, generating a disc wear path of about 140 cm$^2$. Each disc was used to grind a separate workpiece for one minute each for a total time of 12 minutes each or for sufficient one minute time segments until no more than 5 grams of metal were removed in any one minute grinding cut.

The performance of the abrasive grain is generally stated as a percent of control, that is the total amount of metal removed for the control example was equal to 100% and the abrasive grain of the test example is reported relative to the control. A coated abrasive product made with a test abrasive grain according to one of the examples which performed 10% better than the control has a performance of 110% of the control.

CONTROL EXAMPLE

The abrasive grain utilized in the control example is that which was commercially available from the 3M Company, St. Paul, Minn., under the trade designation of Cubitron abrasive grain. Cubitron abrasive grain comprises 94% alpha alumina which was nucleated with 6% by weight of alpha alumina and 6% magnesium oxide. The abrasive grain was employed in a coated abrasive and tested as described above.

EXAMPLES 1 to 4

The abrasive grains manufactured according to Examples 1 to 4 demonstrated various iron oxide nucleating agents. The abrasive grains were prepared according to the "General Procedure for Making the Sol Gel Abrasive Grains". The resulting abrasive grain had a composition of approximately 94.5% alpha alumina, 4.5% magnesium oxide and 1% iron oxide. Coated abrasives were prepared and tested with results being set forth in Table I.

EXAMPLE 1

This example included alpha FeOOH as the nucleating agent. A 207 gram aliquot of a 10% FeOOH solids aqueous slurry was added to the charge. The nucleating agent was prepared by reacting ferrous sulfate with sodium hydroxide in the presence of oxygen to form acicular alpha FeOOH having an average particle size of 180 nm and a surface area of 80 m$^2$/g. The particle size was controlled by the solution pH, concentration, reaction temperature and oxidizing rate. The precipitate was washed with water to remove excess sodium and sulfate ions.

EXAMPLE 2

The nucleating agent of this example was added as a 203 gram aliquot of a 10.2% solids aqueous slurry of alpha FeOOH having an average particle size of 40 nm and a surface area of 200 m2/g.

EXAMPLE 3

The nucleating agent of this example was added as a 828 gram aliquot of a 2.5% solids aqueous slurry of gamma FeOOH having an average particle size of 60 nm. The gamma FeOOH nucleating agent was prepared by oxidizing a solution of ferric chloride, hydrochloric acid and sodium hydroxide, washing the resultant precipitate with water to remove the sodium ions and controlling the particle size by adjusting the pH and oxidation rate.

EXAMPLE 4

The nucleating agent of this example was added as a 900 gram aliquot of a 2.3% solids aqueous slurry of delta FeOOH having a 60 nm average particle size. The delta FeOOH nucleating agent was prepared by oxidizing ferrous sulfate and sodium hydroxide with hydrogen peroxide and washing the resultant participate with water to remove the sodium ions.

TABLE I

| Comparison of Abrasive | Made with Different Nucleating Agents | |
|---|---|---|
| Ex. No. | Nucleating Agent | Average Particle Size (nm) | Total Cut (% of Control) |
| 1 | alpha FeOOH | 180 | 103 |
| 2 | alpha FeOOH | 40 | 111 |
| 3 | gamma FeOOH | 60 | 89 |
| 4 | delta FeOOH | 50 | 102 |

EXAMPLES 5 to 6

The composition of Examples 5 and 6 compared the performance of an abrasive grain utilizing alpha FeOOH and Fe$_3$O$_4$ nucleating agents, respectively. The abrasive grains were tested for abrasiveness in coated abrasive products and the test results are set forth in Table II.

EXAMPLE 5

The abrasive grain of this Example was produced according to the procedure outlined in the "General Preparation of Sol Gel Abrasive Grain" except for the ingredient charge. The charge was 9750 grams of room temperature deionized water, 150 grams of an aqueous solution of 70% nitric acid, 2,990 grams of alpha aluminum oxide monohydrate powder sold under the trade designation Disperal ® and 311 grams of a 10% solids aqueous slurry of alpha FeOOH nucleating agent. The nucleating agent was that described in Example 1. The resulting abrasive grain had a composition of approximately 94.5% alpha alumina, 4.5% magnesium oxide and 1% iron oxide.

EXAMPLE 6

The composition of this Example was made and tested in the same manner as Example 5 except that the weight of the deionized water was 9460 grams and a different nucleating agent was utilized. The nucleating agent was a 3.6% solids aqueous slurry of 60 nm Fe$_3$O$_4$ and 311 grams of this slurry charged to the dispersion. The nucleating agent was prepared by dissolving in deionized water one part ferric nitrate with 2 parts ferrous sulfate, followed by the addition of ammonium hydroxide to precipitate Fe$_3$O$_4$. The resulting abrasive grain had a composition of approximately 94.5% alpha alumina, 4.5% magnesium oxide and 1% iron oxide.

TABLE II

| Comparison of Abrasive Made with Different Nucleating Agents | | |
|---|---|---|
| Ex. No. | Nucleating Agent | Average Particle Size (nm) | Total Cut (% of Control) |
| 5 | alpha FeOOH | 180 | 106 |
| 6 | Fe$_3$O$_4$ | 60 | 102 |

EXAMPLES 7 to 10

The abrasive grains produced according to the procedure outlined in Examples 7 to 10 illustrate the unexpected relationship between the iron oxide nucleating agent particle size and the amount of magnesium oxide needed to produce a superior abrasive grain. The test results of coated abrasive products made with Examples 7-10 are set forth in Table III.

EXAMPLE 7

The abrasive grain of Example 7 was according to the "General Preparation of Sol Gel Abrasive Grains" except for the charge weights of ingredients. The charge was 9750 grams of room temperature deionized water, 150 grams of a solution of 70% nitric acid, 2,990 grams of alpha aluminum oxide monohydrate powder sold under the trade designation Disperal ® and 112 grams of a 10% solids of aqueous slurry the alpha FeOOH nucleating agent of Example 1. The resulting abrasive grain comprised approximately 95% alpha alumina, 4.5% magnesium oxide and 0.5% iron oxide.

EXAMPLE 8

Example 8 was as Example 7 except that the nucleating agent was added as 140 g of an 8% solids aqueous slurry of the alpha FeOOH of Example 2.

EXAMPLE 9

The abrasive grain of Example 9 was prepared according to the "General Preparation of Sol Gel Abrasive Grains" except for the ingredient charge weights and the absence of magnesium nitrate. The charge was 8,115 grams of room temperature deionized water, 173 grams of a solution of 70% nitric acid, 4,550 grams of alpha aluminum oxide monohydrate powder sold under the trade designation Disperal ® and 170.6 grams of a 10% solids aqueous slurry of the alpha FeOOH nucleating agent of Example 1. The resulting abrasive grain comprised approximately 99.5% alpha alumina and 0.5% iron oxide.

EXAMPLE 10

The abrasive grain for Example 10 was prepared as Example 9 except that the nucleating agent was added as 213.2 g of an 8% solids slurry of the alpha FeOOH of Example 2.

TABLE III

| Ex. No. | Average Particle Size (nm) | MgO Content (%) | Total Cut (% of Control) |
|---|---|---|---|
| 7 | 180 | 4.5 | 106 |
| 8 | 40 | 4.5 | 117 |
| 9 | 180 | 0 | 70 |
| 10 | 40 | 0 | 106 |

A dramatic reduction in the amount of magnesium oxide needed to produce a superior abrasive grain was noted as the average particle size of the nucleating agent decreased. This unexpected advantage represents a process cost reduction since it reduces residual nitrogen oxide gas emissions (since the magnesium is typically added as the nitrate) and also reduces the amount of magnesium alumina spinel which is softer than alpha alumina, and in some cases could reduce performance.

EXAMPLES 11 to 14

The abrasive grains prepared according to Examples 11 through 14 illustrate the improvement in performance achieved as the average particle size of the oxide nucleating agent is decreased. The test results can be found in Table IV.

EXAMPLE 11

The abrasive grain of Example 11 was synthesized according to the procedure outlined in the "General Preparation of Sol Gel Abrasive Grains" except for the component charge which with other differences omitted magnesium nitrate. The charge was 10,000 grams of room temperature deionized water, 233 grams of a 70% solution of nitric acid, 3,889 grams of alpha aluminum oxide monohydrate powder sold under the trade designation Disperal ® and 90.3 grams of a 36% solids slurry of 400 nm alpha FeOOH nucleating agent which had a surface area of 37 $m^2/g$. The resulting abrasive grain comprised approximately 99.0% alpha alumina and 1.0% iron oxide.

EXAMPLE 12

The abrasive grain for Example 12 was as Example 11 except that the nucleating agent was added as 295 g of an 11% solids slurry of alpha FeOOH having an average particle size of 120 nm and a surface area of 120 $m^2/g$. The resulting abrasive grain comprised approximately 99.5% alpha alumina and 1.0% iron oxide.

EXAMPLE 13

The abrasive grain of Example 13 was according to the "General Preparation of Sol Gel Abrasive Grains" except for the charge weights of the ingredients. The charge was 9,000 grams of room temperature deionized water, 135 grams of a 70% solution of nitric acid, 2,250 grams of alpha aluminum oxide monohydrate powder sold under the trade designation Disperal ® and 82.1 grams of a 20.7% solids slurry of 250 nm alpha FeOOH nucleating agent having a surface area of 70 $m^2/g$. The resulting abrasive grain comprised approximately 99.0% alpha alumina and 1.0% iron oxide.

EXAMPLE 14

The abrasive grain of Example 14 was according to the "General Preparation of Sol Gel Abrasive Grains" except for the charge weight of ingredients. The charge was 500 grams of room temperature deionized water, 116.5 grams of a 70% solution of nitric acid, 1,945 grams of alpha aluminum oxide monohydrate powder sold under the trade designation Disperal R and 270.8 grams of a 6% solids of 40 nm alpha FeOOH nucleating agent having a surface area of 200 $m^2/g$. The resulting abrasive grain comprised approximately 99.0% alpha alumina and 1.0% iron oxide.

TABLE IV

| Ex. No. | Average Particle Size (nm) | Surface Area ($m^2 g$) | Total Cut (g) |
|---|---|---|---|
| 11 | 400 | 37 | 548 |
| 12 | 120 | 120 | 859 |
| 13 | 250 | 70 | 730 |
| 14 | 40 | 200 | 1053 |

It can be observed that as the average particle size of the nucleating agent is reduced the abrasive performance is increased.

EXAMPLES 16 to 19

The compositions of the abrasive grains made according to Examples 16 to 19 compare the performance of an abrasive grain which utilized alpha alumina as a nucleating agent with that which employed iron oxide nucleating agent according to the invention. The test results are set forth in Table V.

EXAMPLE 16

The abrasive grain of Example 16 was prepared according to the "General Preparation of Sol Gel Abrasive Grains" except for the charge of ingredients. The charge was 6951 grams of deionized water, 120 grams of a 70% solution of nitric acid, 3,272 grams of alpha aluminum oxide monohydrate powder sold under the trade designation Disperal ® and 646 grams of a 1.9% solids solution of an alpha alumina nucleating agent. The nucleating agent was prepared by acidifying with nitric acid a 55% solids slurry of alpha alumina purchased from Alcoa under the trade designation of A-16SG to a pH between 1.6 to 2.5. The slurry was then diluted to maintain fluidity and ball milled in the presence of alumina milling media for 25 days. The milled slurry was centrifuged and aged by allowing it to stand for about 2 years to remove sediment. The particle size of the resulting smaller alpha alumina particles in the supernatant was found by photon correlation spectroscopy to be 58 nm. The resulting abrasive grain was essentially 100% alpha alumina with about 0.5% of the alpha alumina originating from the alpha alumina seed.

EXAMPLE 17

The abrasive grain of Example 17 was prepared according to the "General Preparation of Sol Gel Abrasive Grains" except for the charge of ingredients. The charge was 8859 grams of deionized water, 160 grams of a 70% solution of nitric acid, 3,900 grams of alpha aluminum oxide monohydrate powder sold under the trade designation Disperal® and 81 grams of an 18% solids slurry of 140 nm alpha alumina nucleating agent. The nucleating agent was prepared by centrifuging a suspension of alpha alumina purchased from Sumitomo Chemical under the trade designation AKP-50 to remove the coarse particles and decanting the unsettled portion suspension, the decanted portion being employed. The resulting abrasive grain was essentially 100% alpha alumina with about 0.5% of the alpha alumina originating from the alpha alumina seed.

EXAMPLE 18

The abrasive grain of Example 18 was prepared according to the "General Preparation of Sol Gel Abrasive Grains" except for the charge of ingredients. The charge was 8859 grams of deionized water, 160 grams of a 70% solution of nitric acid, 3,900 grams of alpha aluminum oxide monohydrate powder sold under the trade designation Disperal® and 81 grams of a 9.7% solids solution of 40 nm alpha FeOOH nucleating agent prepared by reacting $FeSO_4$ with NaOH. The resulting abrasive grain was essentially 99.5% alpha alumina and 0.5% iron oxide originating from the iron oxide seed particles.

EXAMPLE 19

The abrasive grain of Example 19 was prepared according to the "General Preparation of Sol Gel Abrasive Grains" except for the charge of ingredients. The charge was 8569 grams of charged deionized water, 160 grams of a 70% solution of nitric acid, 3,900 grams of alpha aluminum oxide monohydrate powder sold under the trade designation Disperal® and 281 grams of a 5.2% solids slurry of 180 nm alpha FeOOH nucleating agent prepared by reacting $FeSO_4$ with NaOH. The resulting abrasive grain was essentially 99.5% alpha alumina and 0.5% iron oxide originating from the iron oxide seed particles.

TABLE V

| Ex. No. | Nucleating Agent | Size (nm) | Total Cut (% of Control) |
|---|---|---|---|
| 16 | alpha alumina | 58 | 117 |
| 17 | alpha alumina | 140 | 123 |
| 18 | alpha FeOOH | 40 | 110 |
| 19 | alpha FeOOH | 180 | 57 |

It was observed from the above data there existed no significant difference in abrasive performance of abrasive grain made with the two different particle sizes of alpha alumina. There was a significant unexpected difference in performance between the abrasive grain made with two different particle sizes of alpha FeOOH.

It is to be understood that while certain embodiments of the present invention have been illustrated and described, the invention is not to be limited to the specific compounds, compositions or methods described and shown.

We claim:

1. A process for forming ceramic abrasive grains, comprising the steps of:
   (a) preparing a dispersion of alpha alumina monohydrate particles;
   (b) seeding said dispersion with up to about .01 to 10% crystalline iron oxide particles
   (c) gelling said dispersion;
   (d) drying the seeded gelled dispersion to form a solid;
   (e) calcining the solid;
   (f) crushing the dried or calcined solid to form particles; and
   (g) sintering the calcined particles, the improvement comprising said crystalline iron oxide particles having an average particle size of less than about 150 nm and said seeding being achieved by adding said crystalline iron oxide particles to said dispersion.

2. The process of claim 1 wherein said crystalline iron oxide particles are selected from the group consisting of goethite, lepidocrocite, hematite, magnetite, maghemite and mixtures thereof.

3. The process of claim 1 wherein the gel also contains a precursor of a modifying additive.

4. The process of claim 3 where the modifying additive precursor is a metal containing compound.

5. The process of claim 4 where said metal is selected from the group consisting of magnesium, zinc, cobalt, nickel, zirconium, hafnium, chromium, yttrium, lanathium, neodynium, titanium and mixtures thereof.

6. The process of claim 1 wherein said average particle size is from 15 to 100 nm.

7. The process of claim 1 wherein said average particle size is from 20 to 30 nm.

8. The process of claim 1 wherein the amount of said iron oxide is from about 0.05% to about 10% by weight based on the weight of the sintered abrasive grains.

9. Ceramic abrasive grain prepared by the method of claim 1.

10. The ceramic abrasive grain of claim 7 including a modifying additive.

11. The ceramic abrasive grain of claim 8 wherein said modifying additive is the oxide of a metal selected from the group consisting of magnesium, zinc, cobalt, nickel, zirconium, hafnium, chromium, yttrium, lanathium, neodynium, titanium and mixtures thereof.

12. An abrasive article comprising abrasive grain at least a portion of which comprises the ceramic abrasive grain of claim 7.

13. The abrasive article of claim 12 where said ceramic abrasive grain also includes a modifying additive.

14. The abrasive article of claim 12 or 13 in the form of a coated abrasive product.

15. The abrasive article of claim 11 or 12 in the form of a bonded abrasive product.

16. The abrasive article of claim 11 or 12 in the form of a bonded abrasive wheel.

17. The abrasive article of claim 11 or 12 in the form of a lofty non-woven abrasive product.

* * * * *

UNITED STATES PATENT AND TRADEMARK OFFICE
CERTIFICATE OF CORRECTION

PATENT NO. : 4,964,883

DATED : October 23, 1990

INVENTOR(S) : MORRIS, et al.

It is certified that error appears in the above-identified patent and that said Letters Patent is hereby corrected as shown below:

Col. 14, line 9-10, In claim 1(b), "up to about .01 to 10% crystalline iron oxide particles" should read —about .01 to 10% crystalline iron oxide particles based on weight of ceramic—.

Col. 14, line 44, "claim 7" should read —claim 6—.

Col. 14, line 46, "claim 8" should read —claim 7—.

Col. 14, line 53, "claim 7" should read —claim 6—.

Col. 14, line 59, "claim 11 or 12" should read —claim 12 or 13—.

Col. 14, line 61, "claim 11 or 12" should read —claim 12 or 13—.

Col. 14, line 63, "claim 11 or 12" should read —claim 12 or 13—.

Signed and Sealed this

Eighth Day of June, 1993

Attest:

MICHAEL K. KIRK

*Attesting Officer*  *Acting Commissioner of Patents and Trademarks*